United States Patent
Lehnert

[11] 3,995,196
[45] Nov. 30, 1976

[54] LOW LEVEL PINCUSHION CORRECTION CIRCUIT

[75] Inventor: Stanley E. Lehnert, Addison, Ill.

[73] Assignee: Zenith Radio Corporation, Chicago, Ill.

[22] Filed: Nov. 4, 1974

[21] Appl. No.: 520,837

[52] U.S. Cl. .............................. 315/370; 315/371; 315/395
[51] Int. Cl.² ......................................... H01J 29/56
[58] Field of Search ..................... 315/370, 371, 395

[56] References Cited
UNITED STATES PATENTS

| | | | |
|---|---|---|---|
| 3,440,482 | 4/1969 | Lister et al. | 315/370 |
| 3,700,958 | 10/1972 | Haferi | 315/371 |

*Primary Examiner*—Maynard R. Wilbur
*Assistant Examiner*—S. C. Buczinski
*Attorney, Agent, or Firm*—Roy A. Ekstrand

[57] ABSTRACT

A television receiver includes circuitry for processing a received signal and displaying video information therein upon the viewing screen of a cathode ray tube. Conventional horizontal and vertical deflection circuitry provide the required scanning signals. A center tapped winding on the receiver's horizontal output transformer is coupled to a pair of oppositely oriented diodes which are coupled to a common load. A vertical trace or scan signal is applied to both diodes, alternately switching them on during the vertical scan interval. The respective portions of vertical scan signal coupled by each diode are serrated in response to the applied horizontal retrace pulses and when combined in the common load form a train of horizontal frequency pulses having first and second portions at opposite polarities and an envelope corresponding to the vertical scan signal. An amplifier, having a collector load tuned to the horizontal scan frequency, is coupled to the common load and produces a "bow-tie" signal which is applied to the receiver's vertical deflection amplifier for top and bottom pincushion correction.

6 Claims, 5 Drawing Figures

LOW LEVEL PINCUSHION CORRECTION CIRCUIT

BACKGROUND OF THE INVENTION

This invention relates in general to scanned display systems and in particular to those utilizing cathode ray tubes such as television receivers.

Among the geometric distortions produced when a beam emanating from a theoretical point source is caused, by synchronous deflection along two axes, to scan a viewing screen having a radius of curvature greater than the center screen-to-point source distance, is pincushion. Pincushion is readily observable when information in the form of a graticule is displayed appearing as a "bowing in" of the reproduced image. If the viewing screen has a greater radius of curvature along both axes (as is the case in present day television receivers), pincushion results along both axes, that is, along horizontal and vertical lines. The former is called "top and bottom" pincushion and the latter "side" pincushion. Quite obviously pincushion distortion is maximized when the radius of the screen curvature is infinite (i.e., flat screen), and while cathode ray tubes generally do not have flat screens, aesthetic considerations usually dictate that nearly flat screens be used.

Of particular interest in the present invention is the top and bottom pincushion or "vertical sag" as it is often called. Analysis of the scanning process typically used in cathode ray display systems shows that a high frequency horizontal deflection system causes side-to-side scanning of the viewing screen while a lower frequency vertical deflection system causes successive side-to-side scans to progress in a downward direction.

It is well known that correction of top and bottom pincushion distortion may be accomplished by adding an appropriate horizontal frequency deflection component to the normal vertical deflection signal. It is also well known that top and bottom pincushion is zero for the midscreen horizontal scan line and increases progressively (i.e., greater sagging) with increased vertical deflection angle. As a result, the correction signal is required to vary in amplitude from a maximum at one polarity, corresponding to horizontal scan lines at the top of the viewing screen through zero, corresponding to those at midscreen, to a maximum at the opposite polarity corresponding to the bottom of the screen. In addition to the amplitude variations described, the horizontal rate signal should, for ideal correction, be of such character that its effect upon the vertical deflection is the complement of the distortion. Such a waveform is quite complex and difficult to fabricate and general practice is to approximate the ideal correction in the form of either a cosine, parabolic, or sine squared waveform.

Top and bottom pincushion compensation systems may be categorized as being either high level or low level, the former characterized by direct yoke current correction and the latter by addition of a correction signal to the vertical deflection amplifier. High level correction uses a saturable reactor in series with the vertical deflection yoke. Horizontal rate signals are applied to balanced inputs of the reactor and a sample of the vertical deflection signal is also applied. The reactor is wound such that the amplitude and polarity of the induced horizontal component coupled to the vertical deflection yoke is determined by the instantaneous polarity and amplitude of the applied vertical signal.

A major drawback of saturable reactor correction is that the reactor must carry the entire vertical scanning current. Conventional cathode ray display systems, such as those used in television receivers, employ "saddle" wound yokes which exhibit relatively high impedances and, therefore, require low deflection currents. As such they produce an ideal environment for the saturable reactor correction systems. However, the present trend is toward the use of toroidal yokes which are characteristically lower in impedance and, therefore, require a greater deflection current to scan corresponding cathode ray tubes than do saddle yokes.

With the increased deflection current required by toroidal yokes, the saturable reactor becomes a prohibitively large, wasteful and expensive device and a very inefficient mechanism for correcting pincushion distortion. As a result the alternative low level systems are currently enjoying increased attention from display system manufacturers.

As mentioned, low level correction systems differ from the above-described high level system in that the appropriate correction waveform is produced by specialized circuitry at a relatively small amplitude and applied to an appropriate point in the vertical deflection amplifier configuration rather than directly to the "high power" yoke.

One of the currently used low level systems comprises a complex circuit in which a balanced modulator imposes the horizontal deflection component on a vertical scan waveform. The circuitry used is complex requiring a two phase, or balanced, output and switching circuitry to switch from one output to another to accomplish the required midscreen phase reversal. This system requires a large number of active devices. Another low level scheme currently used includes a horizontal signal amplifier driven by a horizontal rate sine wave signal. An additional phase inverter is switched into the circuit alternating the polarity of the signal applied to the vertical deflection amplifier during the appropriate portion of vertical scan. This system, while less costly than the modulator scheme, does not appear to consistently produce the required correction signal needed and finds little use.

OBJECTS OF THE INVENTION

Accordingly, it is an object of the present invention to provide an improved display system.

It is a more particular object to provide an improved display system having a low cost, highly simplified, precise pincushion correction circuit.

SUMMARY OF THE INVENTION

Display means include a scannable viewing screen having geometry such that pincushion distortion is introduced during the scanning process. High frequency scanning means produce high frequency scan signals for scanning the viewing screen in a first direction and low frequency scanning means produce low frequency scan signals for scanning the viewing screen in a second direction. Pulse means, coupled to both the high and low frequency scanning means, form a train of output pulses which are at a predetermined phase with the high frequency scan signals and have a portion at one polarity and a portion at an opposite polarity. The envelope of the train of pulses corresponds to the applied low frequency scan signals. Wave forming means are coupled between the pulse means and the low frequency scanning means and produce a compensating pincushion distortion correction on the viewing screen.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the several figures of which like reference numerals identify like elements, and in which:

DESCRIPTION OF THE PREFERRED EMBODIMENT

Figure 1:
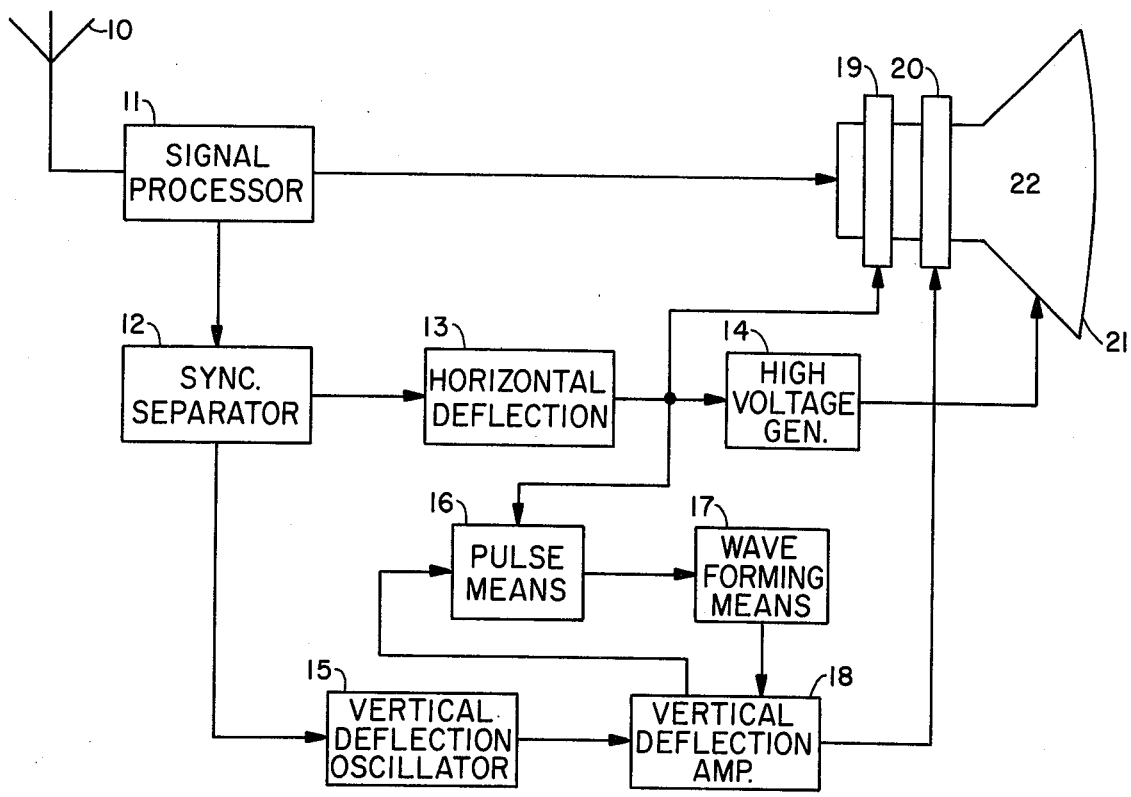
FIG. 1 is a block diagram representation of a television receiver constructed in accordance with the present invention.

FIG. 1 shows a television receiver constructed in accordance with the present invention in which a signal, bearing modulation components of picture information together with deflection synchronization signals, incident on antenna 10 is supplied to a signal processor 11. Signal processor 11 includes conventional circuitry to detect and amplify the modulation components and is coupled to the control electrodes (not shown) of a cathode ray tube 22 and to a sync separator 12. The amplified picture information intensity modulates the cathode ray tube electron beams impinging on a viewing screen 21.

The demodulated output of signal processor 11, including both picture and deflection synchronization components, is coupled to sync separator 12 which separates the deflection synchronization components from the picture information. The output of sync separator 12 is coupled to a horizontal deflection system 13 and a vertical deflection oscillator 15. The output of horizontal deflection system 13, which comprises a horizontal rate scanning signal, is applied to a horizontal deflection yoke 19, for electromagnetically deflecting the cathode ray tube electron beam to produce horizontal scanning of screen 21, and to a high voltage generator 14. The latter produces a high voltage electron accelerating potential for application to cathode ray tube 22. Vertical deflection oscillator 15 produces a vertical scan signal which is coupled to a vertical deflection amplifier 18 which, in turn, drives a vertical deflection yoke 20. The output of horizontal deflection system 13 and vertical deflection amplifier 18 are applied to a pulse means 16 which is coupled to a wave forming means 17. The output of wave forming means 17 is applied to vertical deflection amplifier 18.

With the exception of pulse means 16 and wave forming means 17 the elements and operation of the receiver shown in FIG. 1 are conventional.

As mentioned earlier, the radius of curvature of viewing screen 21 is substantially greater than the distance from the screen center to the deflection center of the cathode ray tube (which approximates the theoretical point source). This geometric relationship will result in pincushion distortion in the displayed image, unless compensatory currents are introduced into the yoke. Since both screen curvature radii are greater than the screen center to deflection center distance, both top and bottom and side pincushion distortion will result. However, the discussions which follow only concern top and bottom or vertical correction.

Figure 2A:
FIGS. 2A–2C show several waveforms produced at points within the receiver shown in FIG. 1.
Figure 2B:
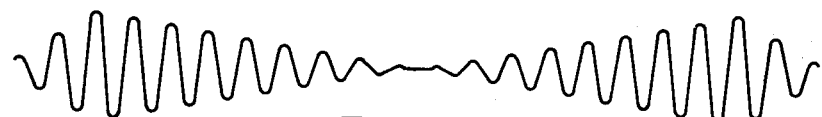

FIG. 2a shows the familiar bow-tie voltage used to correct top and bottom pincushion distortion. It comprises sinusoidal signals having a frequency equal to the horizontal scanning rate (indicated by interval H). As described above, the magnitude of correction required by successive horizontally scanned lines is a function of vertical deflection angle, being zero at midscreen and increasing as the deflection angle is increased. Because the direction of distortion for above-center is opposite to that for below-center portions, the sinusoidal signals in the bow-tie must be of opposite phase for the upper and lower halves of the viewing screen. This bow-tie signal is produced at the output of wave forming means 17 (in a manner to be described below) and applied to vertical deflection amplifier 18 wherein it is added to the conventional vertical scan signal to produce the composite signal shown in FIG. 2b. The FIG. 2b waveform is that supplied to vertical deflection yoke 20 and, therefore, includes not only the ramp voltage portion corresponding to the vertical trace interval (V) but also the negative going retrace pulse. This pulse is produced during the vertical retrace interval ($V_R$) by the abrupt yoke current change which necessarily occurs at the end of each trace interval. The magnitude of the correction is exaggerated in this and other figures to assist in illustration.

Figure 2C:

FIG. 2c shows a pulse train produced by pulse means 16 which will be discussed below.

The inductance of vertical yoke 20 is of little significance for the low frequency vertical scan signals. However, the inductive reactance of the yoke is substantial for the higher frequency sinusoidal components of the bow-tie signal. Therefore, the sine wave voltage variations produce cosine variations of yoke current which, as mentioned, closely approximate the ideal correction currents required.

Figure 3:
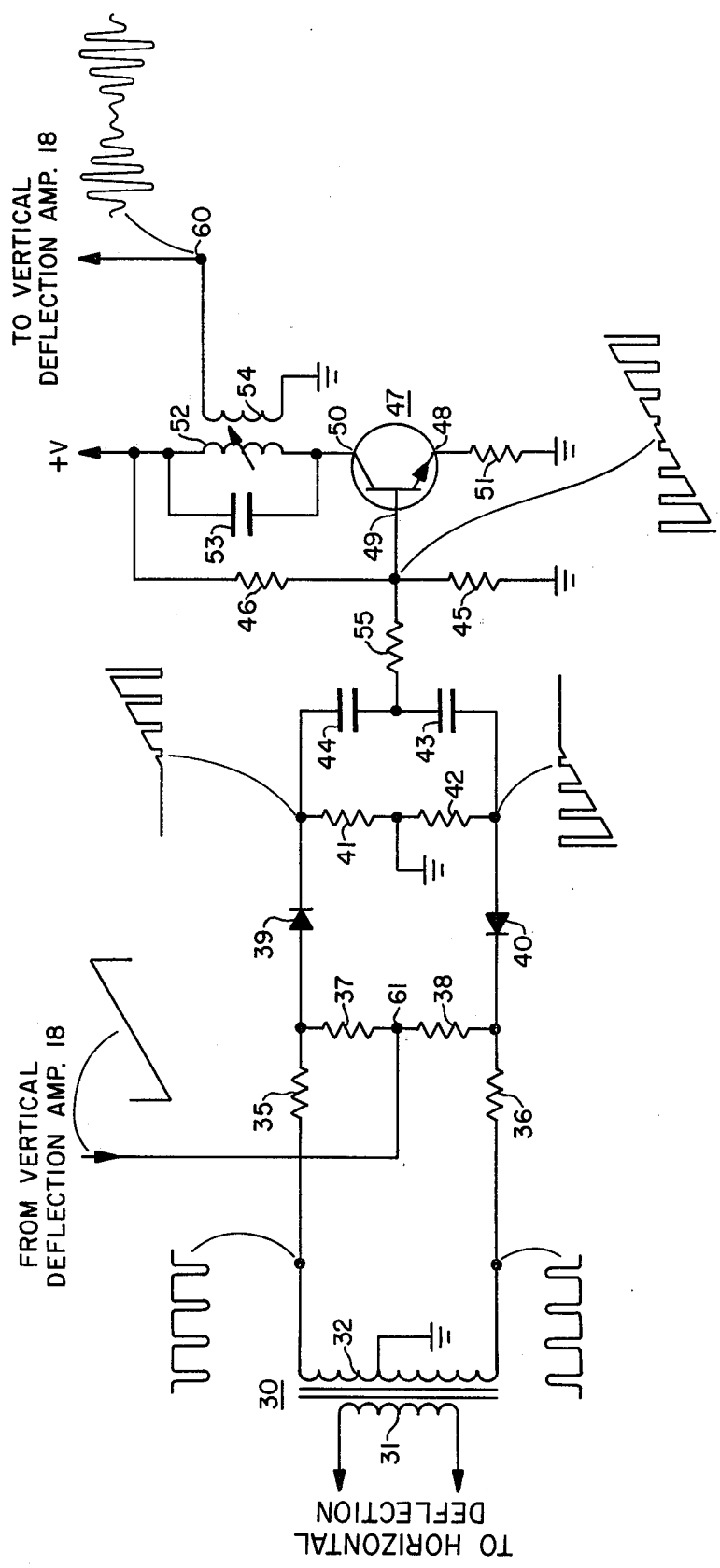
FIG. 3 is a schematic detail of portions of the receiver shown in FIG. 1.

FIG. 3 shows a schematic diagram of pulse means 16 and wave forming means 17. A transformer 30 has a primary winding 31 coupled to a source of high frequency scanning signals and a center tapped secondary winding 32 coupled to resistors 35 and 36. In a television receiver environment, transformer 30 may be the conventional horizontal output transformer and secondary winding 32 may be an additional winding thereon. Resistor 35 connects one end of winding 32 to the junction of a resistor 37 and the anode of a diode 39. Resistor 36 connects the other end of winding 32 to the junction of a resistor 38 and the cathode of a diode 40. Resistors 37 and 38 are series connected between the anode and cathode of diodes 39 and 40, respectively, defining an input terminal 61 at their junction. The cathode of diode 39 and the anode of diode 40 are connected via the parallel combination of series connected capacitors 43 and 44 and series connected resistors 41 and 42. The junction of resistors 41 and 42 is grounded and the junction of capacitors 43 and 44 is coupled by a resistor 55 to the junction of a pair of resistors 45 and 46. A transistor 47 has an emitter 48 coupled to ground by a resistor 51, and a base 49 coupled to ground through resistor 45 and to a source of operating potential (+V) through resistor 46. Its collector 50 is coupled to +V by a parallel combination of a capacitor 53 and a tunable transformer primary winding 52. A secondary winding 54, magnetically coupled to primary winding 52, has one end grounded and the other end terminating in an output terminal 60.

Input terminal 61 is connected to receiver vertical rate scan signals from vertical deflection amplifier 18 and output terminal 60 is connected to supply bow-tie correction signals to a suitable point (not shown) in vertical deflection amplifier 18.

For convenience, the various waveforms of signals in the circuit are indicated. In operation a vertical rate scan signal having a first portion at a negative potential and a second portion at a positive potential is applied to diodes 39 and 40 through resistors 37 and 38, respectively. Diode 40 is biased into conduction during the negative portion of the applied vertical signal and cut off during the positive portion thereof. Conversely diode 39 is cut off during the negative signal portion and is driven conductive during the positive signal portion. As a result, diodes 39 and 40 are alternately switched in response to the applied vertical scan signal.

Assume that transformer 30 represents a portion of a conventional horizontal output transformer in which a long duration trace signal and short duration retrace pulse are produced by a horizontal deflection system. Winding 31 is intended to be illustrative of the primary energy input of the deflection system and may take any of several forms commonly used. Because the center tap of secondary winding 32 is grounded, opposite polarity horizontal retrace pulses are available at each winding end.

The horizontal retrace pulses are applied to diodes 39 and 40 at a polarity which turns them off, that is negative going pulses are supplied to the anode of diode 39 and positive going pulses supplied to the cathode of diode 40. The pulses are of sufficient amplitude to "override" the maximum amplitude of the vertical scan signal. Obviously, the negative going pulses at the anode of diode 39 have no effect upon its conduction during the diode off time (negative portions of the vertical scan signal). During conductive periods (positive portions of the vertical scan signal) the negative going pulses interrupt or serrate the diode conduction current at the horizontal pulse rate. Similarly, positive going retrace pulses at the cathode of diode 40 interrupt or serrate its conduction current at the horizontal pulse rate, but have no effect upon the diode during its nonconductive period. Thus the alternate conduction currents of diodes 39 and 40 are each serrated by the applied horizontal retrace pulses. The portions are added at base 49 of transistor 47 to form the composite waveform shown in FIG. 2c.

It should be noted that since diodes 39 and 40 are turned off by the retrace pulses, the serrations formed are effectively clamped at ground level yielding a precise pulse train varying in amplitude directly with the vertical scan signal. Examination of FIG. 2c shows that the pulse train exhibits the desired amplitude variation as a function of vertical deflection as well as the desired polarity reversal at midscan mentioned above.

The train of pulses applied to base 49 causes conduction changes in transistor 47 which excite the parallel resonant tank circuit composed of capacitor 53 and winding 52 to oscillate. Because transformer 52 is tuned, that is, frequency resonant at the horizontal scan frequency, each successive horizontal pulse produces a corresponding sinusoidal voltage variation across winding 52 due to ringing of the resonant tank. The tank circuit is heavily damped by the selection of transformer winding ratios (windings 52 and 54) to prevent extraneous or sustained tank circuit oscillations.

The sine wave signal produced corresponds in amplitude and phase to the amplitude and polarity of the exciting pulse. Each sine wave or "ring" of the tank is controlled in phase by the exciting pulse producing it, assuring a constant timing relationship between the retrace pulse derived from the horizontal deflection system and the correction signal produced.

In production of television receivers, adjustment of this timing relationship to compensate for inconsistencies in picture tube and yoke combinations is often necessary. The effect of a "phasing control" is obtained in the present circuit by varying the reactance of primary winding 52, which varies the phase relationship between the signals in windings 52 and 54 and thereby the "timing" of the corrective effect on the displayed image.

The output signal at terminal 60 is coupled to an appropriate point in the vertical deflection amplifier (not shown) such that the correction signal has the proper polarity effect upon the vertical yoke current. It should be obvious that selection of the point of application is peculiar to the type of vertical deflection amplifier used.

What has been disclosed is a scanning type display system in which low level bow-tie pincushion correction signal is produced with a minimum number of additional components. The inventive system is generally amplitude insensitive as long as the applied high frequency pulses are larger than the maximum amplitude of the vertical scan signal to be corrected.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

What is claimed is:

1. Display means, including a scannable viewing screen having geometry such that pincushion distortion is introduced during scanning, comprising:
   high frequency scanning means, producing high frequency scan signals comprising long duration trace components and short duration retrace components for scanning said viewing screen in a first direction, and a source of said high frequency retrace component at first and second polarities;
   low frequency scanning means, producing low frequency scan signals comprising long duration trace components of a substantially ramp-like variation between opposite polarity extremes corresponding to the beginning and end of viewing screen scan in said second direction said low frequency scan signal defining a zero or crossover approximately corresponding to the midpoint of said viewing screen, for scanning said viewing screen in a second direction;
   pulse means, forming a train of output pulses at a predetermined phase with said high frequency scan signals, having first switching means, including a first diode, having anode and cathode electrodes, said cathode electrode being coupled to said source of retrace components at said first polarity, forming a first portion of said train of output pulses at one polarity and second switching means, including a second diode, having anode and cathode electrodes, said anode electrode being coupled to said source of retrace components at said second polarity, forming a second portion of said train of output pulses at an opposite polarity, said portions having an envelope corresponding to said low frequency scan signals;

means coupling said trace component of said low frequency scan signal to said first and second switching means causing said first and second switching means to be alternately conductive in response to said low frequency signal;

a common impedance coupled to said anode electrode of said first diode and said cathode electrode of said second diode, said first and second diodes being oppositely oriented with respect to said means coupling said low frequency scan signals; and wave forming means, coupled between said pulse means and said low frequency scanning means, producing a compensating pincushion distortion correction signal.

2. Display means as set forth in claim 1, wherein said first polarity of retrace components is positive and said second polarity of retrace components is negative.

3. Display means as set forth in claim 2, wherein said wave forming means includes:

circuit means having a resonant frequency network tuned to oscillate at the frequency of said high frequency scan signals.

4. Display means as set forth in claim 3, wherein said circuit means includes:

amplifying means having an input coupled to said pulse means and an output coupled to said resonant frequency network.

5. Display means as set forth in claim 4, wherein said scanable viewing screen is in a cathode ray tube in a television receiver, said low frequency scanning means provides vertical scan of said cathode ray tube and said high frequency scanning means provides horizontal scan of said cathode ray tube.

6. Display means, including a scannable viewing screen and having geometry such that pincushion distortion is introduced during scanning, comprising:

high frequency scanning means producing high frequency scan signals for scanning said viewing screen in a first direction;

low frequency scanning means producing low frequency scan signals for scanning said viewing screen in a second direction;

pulse means, coupled to both said high and low frequency scanning means forming a train of output pulses at a predetermined phase with said high frequency scan signals, having a first portion at one polarity and a second portion at an opposite polarity, said portions having an envelope corresponding to said low frequency scan signals; and wave forming means, including a tank circuit coupled to said low frequency scanning means having a resonant frequency equal to that of said high frequency scan signals and including amplifying means having an input electrode coupled to said pulse means, a common electrode, and an output electrode coupled to said tank circuit, said waveforming means producing a compensating pincushion distortion correction signal having a predetermined phase relationship with said train of output pulses by ringing said tank circuit.

* * * * *